(12) United States Patent
Fraser et al.

(10) Patent No.: US 6,996,397 B2
(45) Date of Patent: Feb. 7, 2006

(54) METHOD OF TRANSITION BETWEEN WIRELESS VOICE AND DATA TRANSMISSIONS

(75) Inventors: Ronald W. Fraser, Lake Orion, MI (US); Dwayne A. Crocker, Oxford, MI (US); Sethu Madhavan, Naperville, IL (US); David A. Adams, Hamtramck, MI (US)

(73) Assignee: General Motors Corporation, Detroit, MI (US)

( * ) Notice: Subject to any disclaimer, the term of this patent is extended or adjusted under 35 U.S.C. 154(b) by 568 days.

(21) Appl. No.: 10/156,264

(22) Filed: May 28, 2002

(65) Prior Publication Data

US 2004/0203730 A1    Oct. 14, 2004

(51) Int. Cl.
*H04Q 7/20*    (2006.01)
(52) U.S. Cl. .................. 455/426; 455/445; 455/456.1; 455/411; 455/457; 370/352; 701/211; 701/208; 701/209; 340/988; 340/995

(58) Field of Classification Search ................ 455/445, 455/456.1, 411, 426; 320/352, 452; 201/211, 201/208, 209; 340/988, 995
See application file for complete search history.

(56) References Cited

U.S. PATENT DOCUMENTS

| | | | | |
|---|---|---|---|---|
| 5,533,019 A | * | 7/1996 | Jayapalan | ................... 370/352 |
| 5,734,981 A | * | 3/1998 | Kennedy et al. | ............ 455/445 |
| 5,799,249 A | * | 8/1998 | Kennedy et al. | ............ 455/411 |
| 6,301,480 B1 | * | 10/2001 | Kennedy et al. | ............ 455/445 |
| 6,535,743 B1 | * | 3/2003 | Kennedy et al. | ......... 455/456.1 |
| 2003/0125048 A1 | * | 7/2003 | Lockhart | .................... 455/456 |

* cited by examiner

*Primary Examiner*—Joseph Feild
*Assistant Examiner*—David Q. Nguyen
(74) *Attorney, Agent, or Firm*—Anthony Luke Simon

(57) ABSTRACT

The invention provides a method of transitioning between voice and data communications with a mobile vehicle. A switch-to-voice command signal is sent from a call center modem pool to the mobile vehicle, and a vehicle switch-to-voice acknowledgement signal is received at the call center. A call from the call center modem pool is switched to a call center advisor in response to the vehicle switch-to-voice acknowledgement signal.

4 Claims, 5 Drawing Sheets

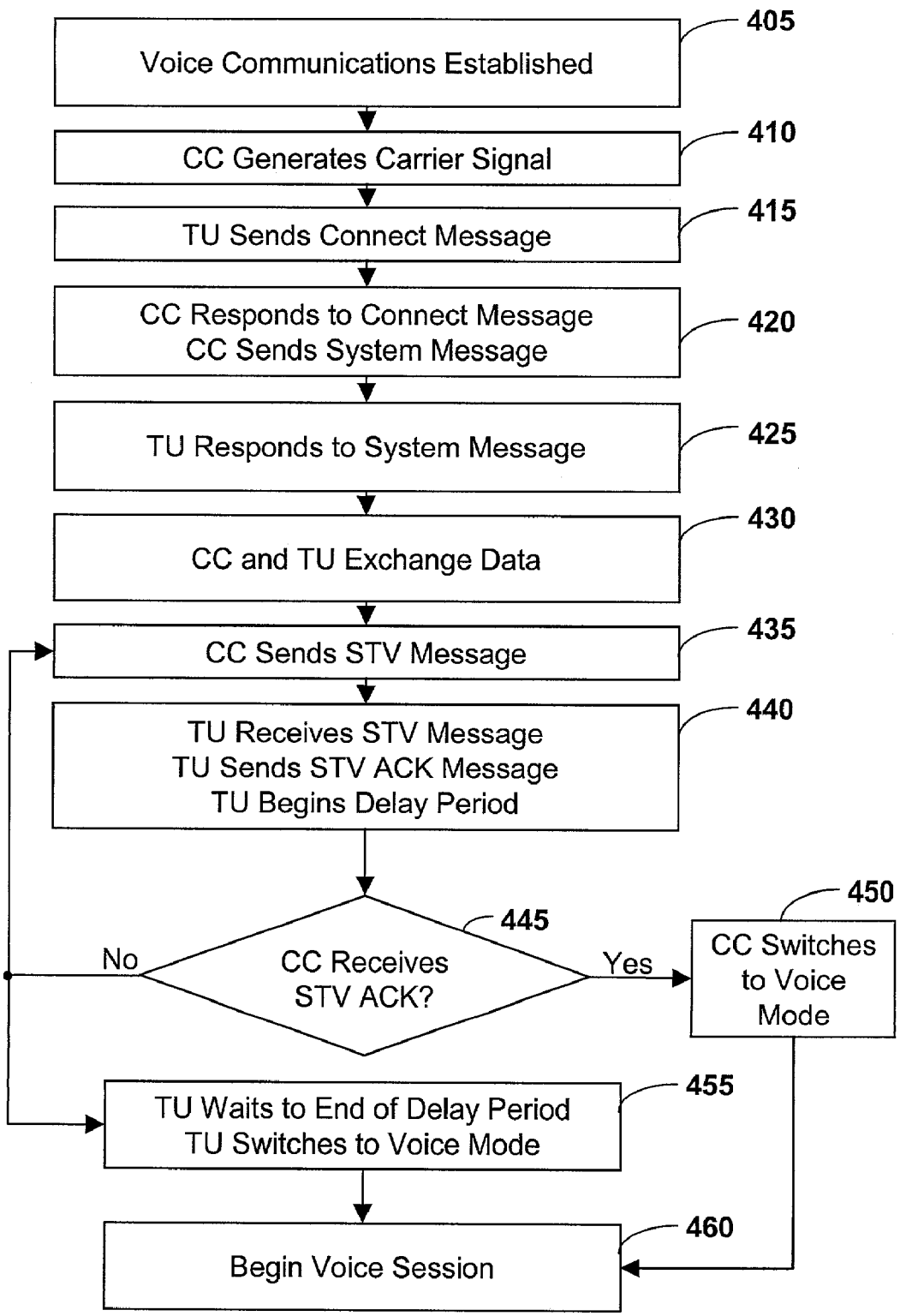

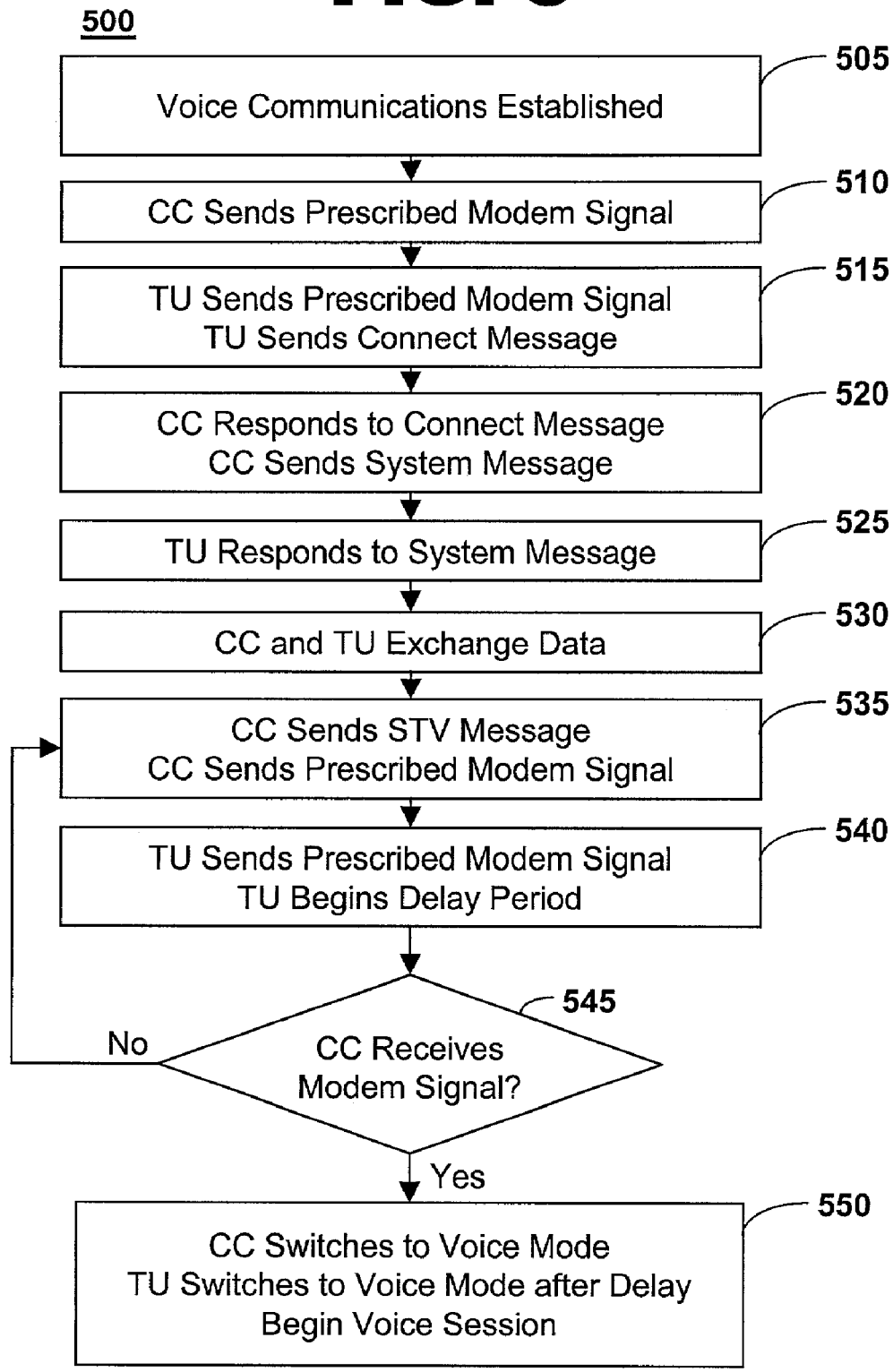

METHOD OF TRANSITION BETWEEN WIRELESS VOICE AND DATA TRANSMISSIONS

FIELD OF THE INVENTION

This invention relates generally to operating a wireless communication system. More specifically, the invention relates to a method for transitioning between data and voice segments within a wireless communication session with a mobile vehicle.

BACKGROUND OF THE INVENTION

Many call centers today have network architectures that use distributed modems at the workstation of each human advisor. Incoming calls may require only one switching event to route the call to an available advisor. Once a call has been directed to the workstation of a call center advisor, modem multiplexing may separate voice and data segments within a session. The network architecture of these call centers have been designed with an emphasis on interactive voice calls with a live advisor supported by modems and database access, rather than on calls that may be directed to an advisor or directed to more automated resources built on a computer server and database system. A desirable feature of these architectures is that they can accommodate either data or voice transmissions over a single voice channel.

Data and voice communications may be sent using a dedicated transport mechanism for data, and a separate voice call over another channel for voice communications. The two transceivers may be integrated, one of which is used for the voice call and the other for the data call. This method requires a modem line associated with each voice line, resulting in a more extensive use of voice lines and modems than is practical for a large-scale call center, which may receive many thousands of calls in a day.

Call centers that are providing telematics service for mobile vehicles center have been offering more services, as well as experiencing tremendous growth in the volume of calls. This growth, which is expected to continue in the foreseeable future, is in part due to the increased percentage of new vehicles being equipped with wireless communication devices. Thus, the call centers need to build scalable network systems with an efficient way to manage the inevitable increase in data and voice calls, while providing customers with a high quality of service and reliability. Ideally, this network system would also benefit from reduced costs associated with a proper balance between advisor and modem requirements, and minimized connection time.

Call centers with a large percentage of data calls may benefit from an alternative network architecture that uses a centralized modem pool. This alternative approach may be more scalable, efficient and cost effective, though may often require switching between the modem pool and an advisor in order to perform numerous data operations and voice communications. The technical challenge in this alternative network architecture becomes the need for rapid and accurate switching between voice and data segments during a single call. The ability to transition reliably from a voice call to a data call becomes a necessary function for the efficient operation of the call center.

It is an object of this invention, therefore, to provide a method for transitioning between data and voice segments during wireless communications between a mobile vehicle and a call center. Additionally, it offers a method to improve the scalability, increase the efficiency and reduce the costs of a call center network, as well as overcome the obstacles described above.

SUMMARY OF THE INVENTION

One aspect of the invention provides a method of transitioning between voice and data communications with a mobile vehicle. A switch-to-voice command signal may be sent from a call center modem pool to the mobile vehicle. A vehicle switch-to-voice acknowledgement signal may be received at the call center. A call from the call center modem pool may be switched to a call center advisor in response to the vehicle switch-to-voice acknowledgement signal.

A call center switch-to-voice acknowledgement signal may be sent from the call center to the mobile vehicle in response to the vehicle switch-to-voice acknowledgement signal. A voice-ready mode at the mobile vehicle may be entered in response to the call center switch-to-voice acknowledgement signal. A voice-ready mode at the mobile vehicle may be entered when a predetermined delay period has elapsed after the vehicle switch-to-voice acknowledgement signal has been sent.

A switch-to-data command signal may be sent from the call center to the mobile vehicle. A vehicle switch-to-data acknowledgement signal may be received at the call center from the mobile vehicle. The call may be switched from the call center advisor to the call center modem pool.

The call at the mobile vehicle may be monitored. A switch-to-data command signal may be received at the mobile vehicle from the call center. A vehicle switch-to-data acknowledgement signal may be sent from the mobile vehicle to the call center. The mobile vehicle may switch to a data-ready mode.

Another aspect of the present invention provides a computer usable medium including a program for transitioning between voice and data communications with a mobile vehicle. The program may include code to send a switch-to-voice command signal from a call center modem pool to the mobile vehicle. The program may include code to receive a vehicle switch-to-voice acknowledgement signal at the call center. The program may include code to switch a call from the call center modem pool to a call center advisor in response to the vehicle switch-to-voice acknowledgement signal.

Another aspect of the present invention provides a system for transitioning between voice and data communications with a mobile vehicle, including means for sending a switch-to-voice command signal from a call center modem pool to the mobile vehicle, means for receiving a vehicle switch-to-voice acknowledgement signal at the call center, and means for switching a call from the call center modem pool to a call center advisor in response to the vehicle switch-to-voice acknowledgement signal.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 is a flow diagram of one embodiment of a method for transitioning between data and voice segments in the middle of a wireless communication session with a mobile vehicle, in accordance with the current invention; and FIG. 5 is a flow diagram of another embodiment of a method for transitioning between data and voice segments in the middle of a wireless communication session with a mobile vehicle, in accordance with the current invention.

DETAILED DESCRIPTION OF THE PRESENTLY PREFERRED EMBODIMENTS

One aspect of the present invention is to transition to and from a data communication segment and a voice segment within a single voice call established between a mobile vehicle and a telematics call center. Tones and messages between wireless communication devices and call centers may be used to signal information such as a device being ready to switch from a data mode to a voice mode or from a voice mode to a data mode. A method for transitioning between data and voice modes may use various combinations of signals, tones, bursts, messages and time sequences, which may include carrier signals, connect request or connect messages, vehicle identification (VID) messages, switch-to-voice (STV) signals and messages, acknowledgement signals and messages, modem signaling, and time delays.

Figure 1:
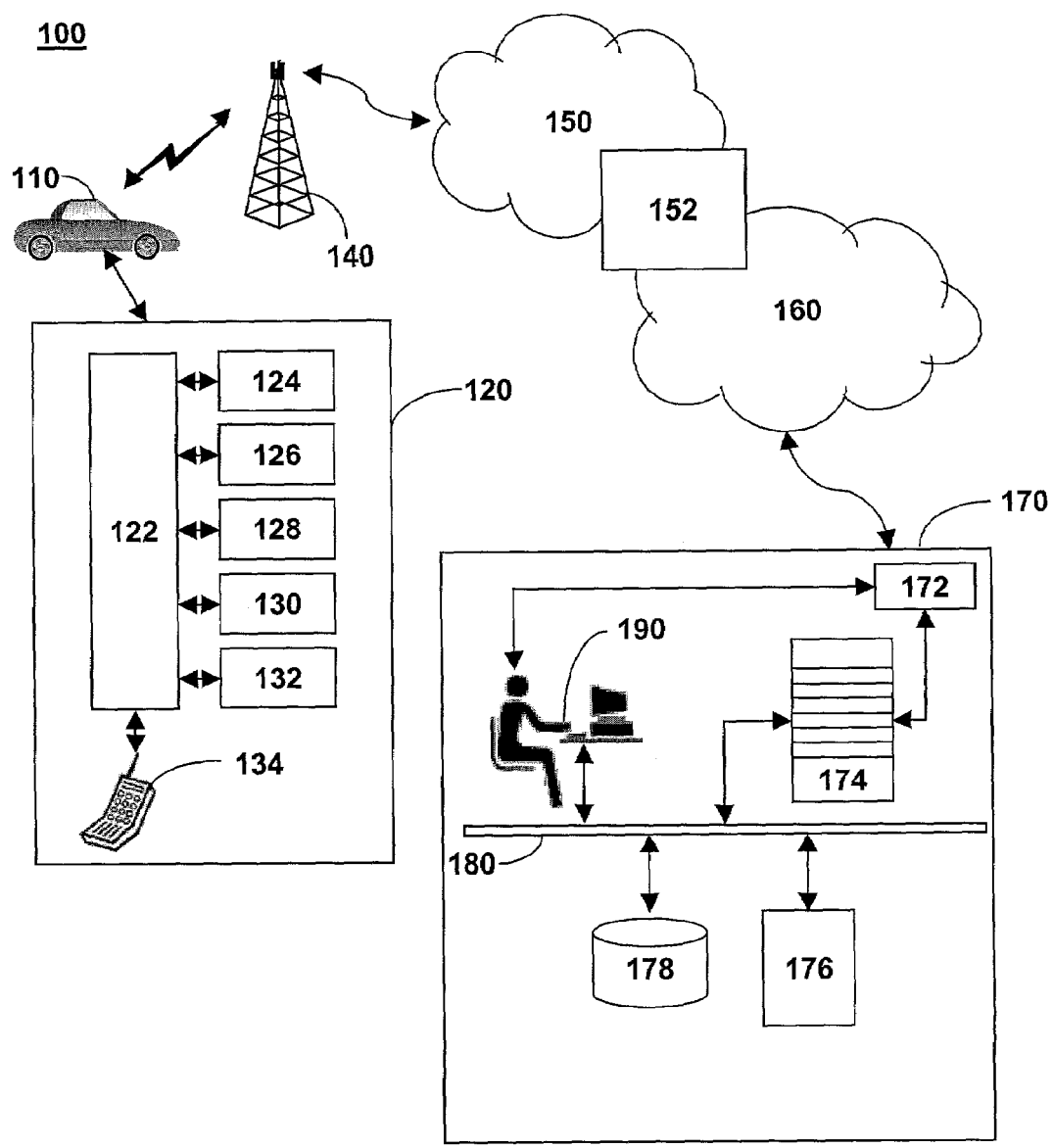
FIG. 1 is an illustration of one embodiment of a system for transitioning between data and voice segments of a wireless communication session with a mobile vehicle, in accordance with the current invention.
Figure 2:
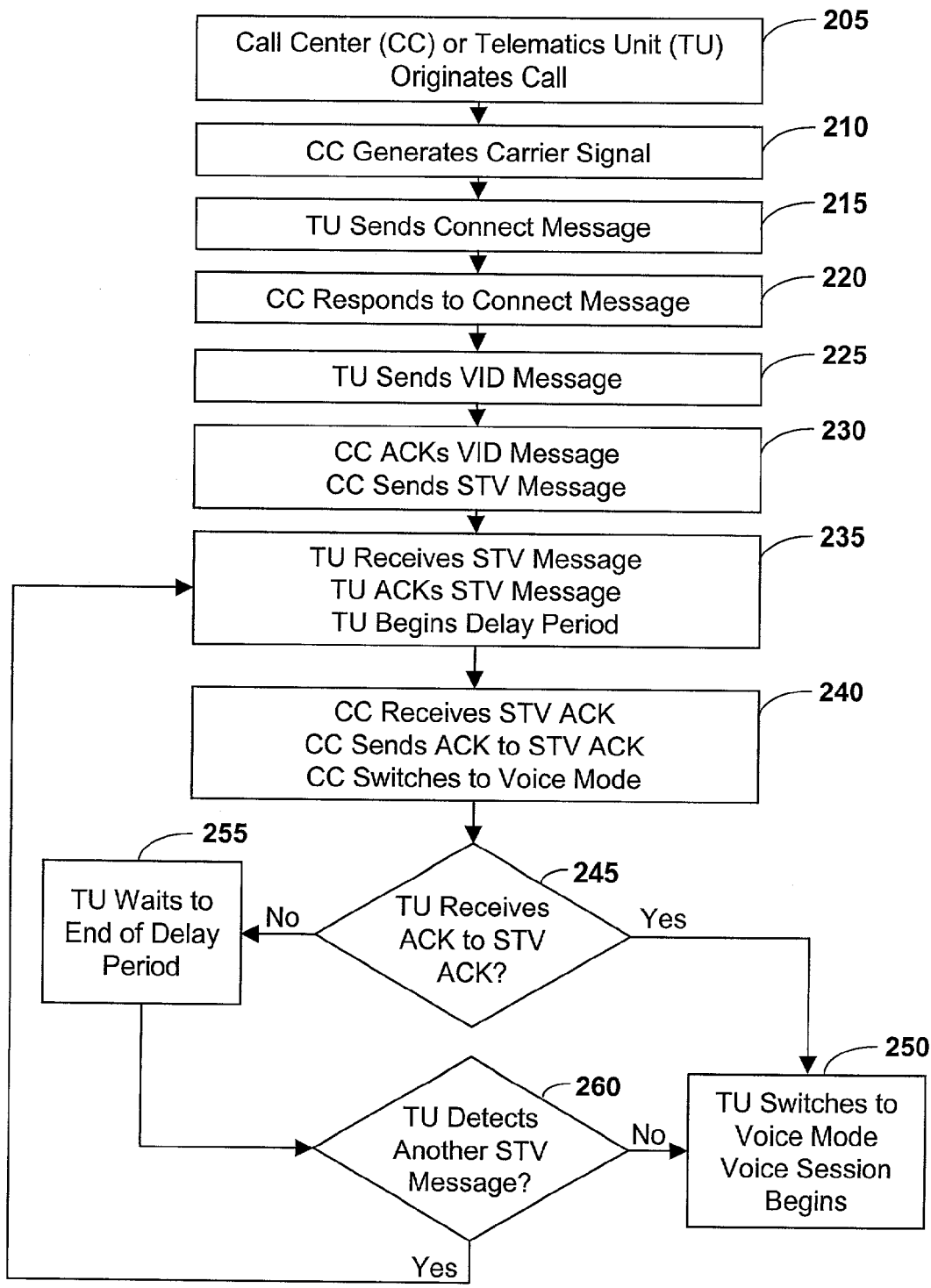
FIG. 2 is a flow diagram of one embodiment of a method for transitioning between data and voice segments at the beginning of a wireless communication session with a mobile vehicle, in accordance with the current invention.
Figure 3:
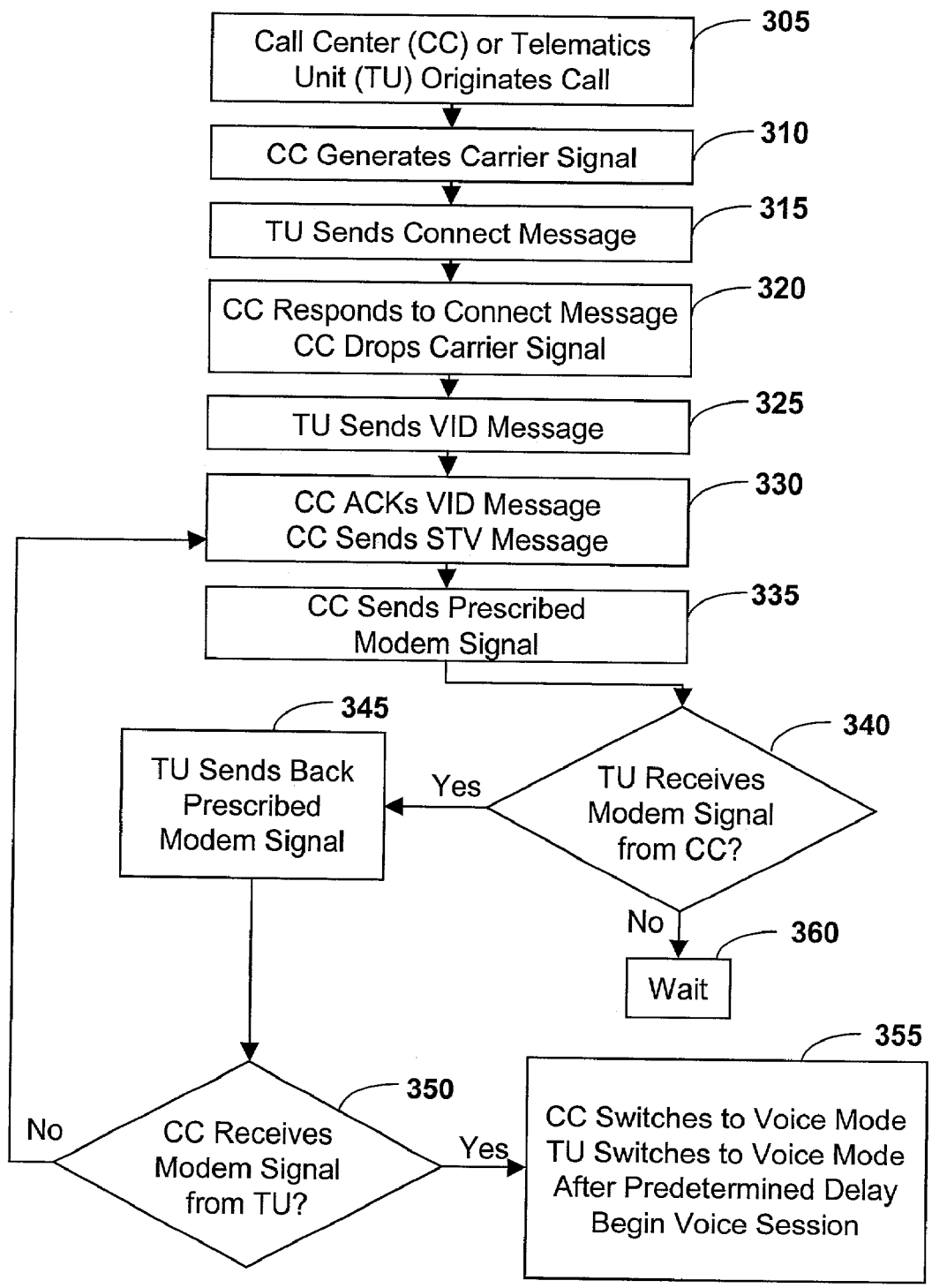
FIG. 3 is a flow diagram of another embodiment of a method for transitioning between data and voice segments at the beginning of a wireless communication session with a mobile vehicle, in accordance with the current invention.

FIG. 1 illustrates a call center architecture that does not require every advisor to have a dedicated modem or every modem to be associated with an advisor, but instead uses a bank or pool of digital modems and a voice/data switch for routing calls between the modem pool and the advisors. This allows for more efficient scaling of call center operations. FIG. 2 and FIG. 3 present scenarios for transitions at the beginning of a wireless communication session, and FIG. 4 and FIG. 5 present scenarios for transitions during a communication session.

FIG. 1 shows an illustration of one embodiment of a system for transitioning between data and voice segments within a wireless communication session between a mobile vehicle and a call center, in accordance with the present invention at 100. The system includes suitable hardware and software for sending a switch-to-voice command signal from a call center modem pool to the mobile vehicle, for receiving a vehicle switch-to-voice acknowledgement signal at the call center, and for switching a call from the call center modem pool to a call center advisor.

Data and voice communication transition system 100 may include a mobile vehicle 110, a telematics unit 120, one or more wireless carrier systems 140, one or more communication networks 150, one or more land networks 160, and one or more call centers 170.

Mobile vehicle 110 may be a mobile vehicle equipped with suitable hardware and software for transmitting and receiving voice and data communications. Mobile vehicle 110 contains telematics unit 120 that may include a vehicle communications processor. Telematics unit 120 may include a digital signal processor (DSP), host processor or system controller 122 connected to an analog, digital or dual-mode wireless modem 124, a global positioning system (GPS) unit 126, an in-vehicle memory 128, a microphone 130, one or more speakers 132, and an in-vehicle mobile phone 134. In-vehicle mobile phone 134 may be an analog, digital, dual band, multi-band, dual-mode, or multi-mode cellular phone. GPS unit 126 may provide, for example, longitude and latitude coordinates of the vehicle.

System controller 122 may contain various computer programs that control programming and operational modes of various systems within mobile vehicle 110. A voice-recognition application may be installed in system controller 122 and translate human voice input through microphone 130 to digital signals. These signals may activate the programming mode and operation modes, as well as input data. Output signals from system controller 122 may be translated into digitized voice messages and may be sent out through speaker 132.

System controller 122 may include a computer program for transitioning between voice and data communications with a telematics service call center. The computer program may include code to enter a voice-ready mode or data-ready mode. System controller 122 may include a computer program to send requests or to respond to call center requests to switch to a voice mode or to switch to a data mode. A computer program may monitor the calls originating from the mobile vehicle or those calls that are received from the call center.

Mobile vehicle 110 via telematics unit 120 may send and receive radio transmissions from wireless carrier system 140. Wireless carrier system 140 may be any suitable system for transmitting a signal from mobile vehicle 110 to communication network 150.

Wireless carrier system 140 may be a wireless communications carrier. Wireless carrier system 140 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications.

Communication network 150 may comprise services from one or more mobile telephone switching offices and wireless networks. Communication network 150 may be a wireless wide-area network (WAN). Communication network 150 may connect wireless carrier system 140 to land network 160. Communication network 150 may be any suitable system or collection of systems for connecting wireless carrier system 140 to mobile vehicle 110 and land network 160.

Mobile switching center (MSC) 152 may be one or more switches used for call control and processing that serve as the interface between communication network 150 and land network 160. MSC 152 may perform signaling functions necessary to establish calls to and from mobile stations.

Land network 160 may be a public-switched telephone network. Land network 160 may be an Internet protocol (IP) network. Land network 160 may be comprised of a wired network, an optical network, a fiber network, another wireless network, or any combination thereof. Land network 160 may connect communication network 150 to call center 170. Communication network 150 and land network 160 may connect wireless carrier system 140 and mobile vehicle 110 to a communication node or call center 170.

Call center 170 may be a telematics service call center. Call center 170 may contain one or more voice and data switches 172, a modem pool 174 with two or more analog, digital, or dual-mode modems, one or more communication services managers 176, one or more communication services databases 178, one or more bus systems 180 and one or more communication services advisors 190.

Call center 170 may be a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may contain each of these functions.

Call center 170 may contain one or more voice and data switches 172. Voice and data switch 172 may be connected to land network 160. Voice and data switch 172 may transmit voice or data transmissions from call center 170. Voice and data switch 172 also may receive voice or data transmissions from telematics unit 120 in mobile vehicle 110 through wireless carrier system 140 and communication network 150, MSC 152, and land network 160.

Voice and data switch 172 may receive from or send to one or more communication services managers 176 data transmissions via modem pool 174. Communication services manager 176 may be any suitable hardware and software capable of providing requested communication services to telematics unit 120 in mobile vehicle 110. Communication services manager 176 may send to or receive from one or more communication services databases 178 data transmissions via bus system 180.

Voice and data switch 172 may receive or send voice communications to or from one more communication services advisor 190. Communication services advisor 190 may be a real human in verbal communication with a user or subscriber in mobile vehicle 110 via telematics unit 120.

Communication services advisor 190 may send or receive information to or from communication services manager 176 via bus system 180. Communication services advisor 190 may send or receive information to or from communication services database 178 via bus system 180.

Communication services manager 176 may provide one or more of a variety of services, including enrollment services, navigation assistance, directory assistance, roadside assistance, business or residential assistance, information services assistance, emergency assistance, communications assistance and activation services for replenishing personal call minutes. Communication services manager 176 may transmit data to telematics unit 120 in mobile vehicle 110 through modem pool 174, voice and data switch 172, land network 160, MSC 152, communication network 150, and wireless carrier system 140. Communication services manager 176 may store or retrieve data and information from communication services database 178. Communication services manager 176 may provide requested information to communication services advisor 190.

Communication services advisor 190 may provide services to telematics unit 120 in mobile vehicle 110. Services provided by communication services advisor 190 may include enrollment services, navigation assistance, directory assistance, roadside assistance, business or residential assistance, information services assistance, emergency assistance, and communications assistance. Information for these services may be retrieved by communication services advisor 190 from communication services manager 176 and communication services database 178. Communication services advisor 190 may communicate with telematics unit 120 in mobile vehicle 110 through voice and data switch 172, land network 160, MSC 152, communication network 150, and wireless carrier system 140 using voice transmissions directly through voice and data switch 172, or using data transmissions directed through communication services manager 176, modem pool 174 and voice and data switch 172.

FIG. 2 shows a flow diagram of one embodiment of a method for transitioning from data to voice wireless communications at the beginning of a communication session with a mobile vehicle, in accordance with the present invention at 200.

Data and voice communication transition method 200 may begin with telematics unit (TU) 120 or call center (CC) 170 originating a voice call, as seen at block 205. The call may be originated, for example, when the user of an in-vehicle phone desires to place a call to the call center so that services may be received. The call may be originated, for example, when the call center needs to send information to the telematics unit such as an update to a roaming list of a mobile phone or other configuration information. The telematics unit in the mobile vehicle call may monitor the call throughout a session to detect digital messages, modem carrier signals, or a switch-to-data command signal.

The first signals that are sent after the call is connected may include a switch-to-data command signal comprising, for example, a carrier signal or a modem carrier tone from the telematics service call center, as seen at block 210. The carrier signal may be, for example, at a frequency of nominally 2225 Hz. The switch-to-data command signal may comprise at least one frequency tone, a sequence of tones, multiple tones transmitted simultaneously, or a burst of tones. The switch-to-data command signal may be a switch-to-data request message, comprising one or more blocks of data. Generally, the transmission and detection of a carrier signal from the call center may occur more quickly than the time to send a switch-to-data request message and therefore, are more desirable.

The telematics unit may receive the switch-to-data command signal and switch to a data-ready mode. During the data-ready mode, the telematics unit may mute the audio to the mobile vehicle and monitor the signals and messages coming from the call center. The telematics unit may send a switch-to-data acknowledgement signal to the call center in response to the switch-to-data command signal. The vehicle switch-to-data acknowledgement signal may include, for example, at least one frequency tone such as a nominally 1270 Hz tone, or may be a tone sequence or a burst of tones. The vehicle switch-to-data acknowledgement signal may be a connect message. A connect message may be made from the telematics unit to the call center, as seen at block 215.

The call center may respond to the connect message, as seen at block 220. The call center may send, for example, a power request to the telematics unit to set its modem carrier signal at a predetermined voltage or power level, or to adjust the power level incrementally. When the response to the connect message or an alternative message is not received back at the telematics unit after a predetermined time, such as after 300 milliseconds, the telematics unit may return to a voice-ready mode. The telematics unit of the mobile vehicle may continue to monitor the call for incoming messages and signals during the voice-ready mode or during a voice segment.

The telematics unit may send a vehicle identification (VID) message after receiving the calling center connect response, as seen at block 225. The vehicle identification number may contain, for example, the serial number of the telematics unit, the vehicle identification number (VIN) assigned at a vehicle manufacturing plant, or an account number assigned by a call center. The VID message may also contain GPS latitude and longitude information.

The call center may send an acknowledgement (ACK) signal or message back to the telematics unit indicating that it received the VID message and that the VID is authenticated, as seen at block 230. Other signals and data messages may be exchanged between the calling center and the telematics unit. The call center may send a switch-to-voice command signal from the call center modem pool to the mobile vehicle. The switch-to-voice command signal may include one or more frequency tones, a sequence of tones, or a tone burst. The switch-to-voice command signal may include a switch-to-voice request message. The STV message may indicate that the call center intends to move from a data segment to a voice segment with a human advisor in the call center.

The telematics unit may receive the switch-to-voice message and send back a vehicle switch-to-voice acknowledgement signal or message to the call center acknowledging that the STV request was received, as seen at block 235. The vehicle switch-to-voice acknowledgement signal may comprise a switch-to-voice acknowledgement message. The vehicle switch-to-voice acknowledgement signal may comprise one or more frequency tones, a sequence of tones, or a tone burst.

The telematics unit may begin a predetermined delay period that begins when the telematics unit sends back an acknowledgement to the STV signal or message. The delay period may be, for example, a period of 300 milliseconds or a time less than two seconds. During this time, the telematics unit may wait for an acknowledgement signal or message from the call center that indicates the vehicle switch-to-voice acknowledgement signal or message from the telematics unit was received.

The call center may receive the switch-to-voice acknowledgement signal from the telematics unit, as seen at block 240. Then the call center may send a call center switch-to-voice acknowledgement signal from the call center to the mobile vehicle in response to the vehicle switch-to-voice acknowledgement signal. In other words, the call center may send back an acknowledgement that it received the STV acknowledgement of the telematics unit. When the call center receives the vehicle STV acknowledgement signal, the call center may respond by switching the call from the call center modem pool to a call center advisor. That is, the call center may switch to a voice mode, whereby a human advisor at the call center can receive a voice transmission from the mobile vehicle.

The acknowledgement signal or message of the call center that was sent in response to the switch-to-voice acknowledgement of the telematics unit may or may not be received by the telematics unit, as seen at block 245.

The telematics unit of the mobile vehicle may enter a voice-ready mode when a predetermined delay period has elapsed after the vehicle switch-to-voice acknowledgement signal has been sent and no acknowledgement to the acknowledgement has been received. The voice-ready mode may include an un-muted audio signal. Alternatively, when the telematics unit receives a return acknowledgement signal from the call center, the telematics unit may enter a voice-ready mode, un-mute its audio and prepare for voice transmission, as seen at block 250. In this case, the telematics unit may begin the voice segment without waiting to the end of the delay period.

When the telematics unit does not receive the return acknowledgement signal or message from the call center, it may wait to the end of the delay period, as seen at block 255. Meanwhile, the telematics unit may detect another STV signal or message, as seen at block 260. When another STV is detected, the telematics unit may resend an STV acknowledgement signal or message, re-mute the audio, and begin another delay period, as seen back at block 235. The sequence of acknowledgements may be repeated again from block 240 onward.

FIG. 3 shows a flow diagram of another embodiment of a method for transitioning from data to voice wireless communications at the beginning of a communication session with a mobile vehicle, in accordance with the present invention at 300.

Data and voice communication transition method 300 may begin with a telematics unit or a telematics call center making a voice call, as seen at block 305. The call may originate from the vehicle, for example, when the user of an in-vehicle phone desires services from the call center. The call may originate from the call center, for example, when the call center needs to send information to the telematics unit such as an update to a roaming list of the mobile phone or other configuration information.

The data or first signals that are sent may include a switch-to-data command signal from the call center to the mobile vehicle. The switch-to-data command signal may be a switch-to-data message request, a modem carrier signal, a modem carrier tone, one or more frequency tones, a sequence of tones or a tone burst from the call center, as seen at block 310. The signal may be a nominally 2225 Hz carrier tone, for example. The telematics unit may send a connect message to the call center, as seen at block 315. Alternatively, the telematics unit may send a vehicle switch-to-data acknowledgement signal comprising, for example, at least one frequency tone such as a nominally 1270 Hz tone. Generally, the detection of a carrier signal from the call center may occur more quickly than the time required to receive a switch-to-data request signal or message.

The call center may respond to the connect message and may drop the carrier signal, as seen at block 320. When the response to the connect message is not received back at the telematics unit after a predetermined time, such as after 300 milliseconds, the telematics unit may send another connect message. The telematics unit and the call center may monitor the call continually for incoming signals.

The telematics unit may send a vehicle identification (VID) message, as seen at block 325. The vehicle identification message may include, for example, the serial number of the telematics unit, the vehicle identification number (VIN) assigned at a vehicle manufacturing plant, or an account number assigned by a call center. The VID message may also contain, for example, GPS latitude and longitude data.

The call center may send an acknowledgement signal or message (ACK) back to the telematics unit indicating that it received the VID message, and then may send a switch-to-voice signal or message (STV), as seen at block 330. The STV signal or message may indicate that the call center intends to move from the data segment to a voice segment with a human advisor in the call center.

The call center may send a prescribed modem signal to direct the telematics unit to switch to voice, as seen at block 335. The prescribed modem signal may be, for example, a proprietary signal determined by the call center or the manufacturer of the telematics unit. The prescribed modem signal may be a carrier tone, a sequence of carrier tones, a set of carrier tones, a burst of carrier tones, or a tone or tone sequence with various other signal modifications such as phase shifts.

The telematics unit may or may not receive the modem signal from the call center, as seen at block 340. When the signal is not received, the telematics unit may enter into a wait mode until an interval timer expires or a modem signal is received from the call center, as seen at block 360. When the signal is not received, the call center may continue to send a prescribed modem signal until a response or a connect message is received successfully. When the interval timer expires, the telematics unit may disconnect to end the connection with the call center, or wait a longer period of time if the interval timer is adjusted.

When the telematics unit receives the modem signal from the call center, it may send back a prescribed modem signal response, as seen at block 345. The call center may or may not receive the modem signal from the telematics unit, as seen at block 350.

When the call center does not receive the prescribed modem signal response, it may continue to send the switch-to-voice signal or message or a modem signal until a response is received successfully, as seen back at block 330. When the call center receives the modem signal, it may switch to a voice mode and route the call to an advisor, as seen at block 355. The telematics unit also may switch to a voice-ready mode after the predetermined delay time has lapsed or an acknowledgement to the response has been received, and begin a voice segment with the call center.

FIG. 4 shows a flow diagram of one embodiment of a method for transitioning from data to voice wireless communications during a communication session with a mobile vehicle, in accordance with the present invention at 400. The voice communications may be previously established and in progress, as seen at block 405.

A switch-to-data command signal, i.e. a carrier signal, a modem carrier tone, or a switch-to-data request message, may be sent from the call center to the telematics unit of the mobile vehicle, as seen at block 410. The call may be monitored continuously at the mobile vehicle and the switch-to-data command signal from the call center may be detected at the mobile vehicle. The switch-to-data command signal may include one or more frequency tones, a sequence of tones, or a burst of tones. It may include a nominally 2225 Hz tone.

The switch-to-data command signal may be received at the mobile vehicle, and the telematics unit may enter a data-ready mode that may include muting the audio to the mobile vehicle. The telematics unit may send a vehicle switch-to-data acknowledgement signal from the mobile vehicle to the call center, comprising at least one frequency tone such as a nominally 1270 Hz tone, or a connect message to the call center, as seen at block 415.

The vehicle switch-to-data acknowledgement signal may be received at the call center. The call center may switch the call from the call center advisor to the call center modem pool. The call center may send a response to the connect message and optionally may send a system message, as seen at block 420. The system message may include, for example, a power request update or a global positioning system vehicle coordinates request.

When the response to the connect message is not received back at the telematics unit after a predetermined time, such as after 300 milliseconds, the telematics unit may remain in data mode and send another connect message. The telematics unit and the call center may monitor the call continually for incoming signals.

The telematics unit at the mobile vehicle may respond to the system message, as seen at block 425. The response may include, for example, a reply with data sent back to the call center. The response may include, for example, the telematics unit performing a requested operation and then sending back data related to that operation. The call center and telematics unit may proceed to exchange data, as seen at 430. This data may include, for example, information from a variety of call center services, such as enrollment services, navigation assistance, directory assistance, roadside assistance, business or residential assistance, information services assistance, emergency assistance, communications assistance and activation services for replenishing personal call minutes. The data also may include, for example, information on an operation of the vehicle or telematics unit such as the updating of a system identification table (SID) and a preferred roaming list of the telematic unit, or the adusting of a vehicle parameter or comfort setting of the mobile vehicle The call center may send a switch-to-voice message after or, in a few cases, during the data exchange, as seen at block 435. The telematics unit may receive the STV message and send back an acknowledgement that the STV message was received, as seen at block 440. The telematics unit may begin a predetermined delay period upon sending the STV acknowledgement.

The call center may or may not receive the acknowledgement to the STV message, as seen at block 445. When the acknowledgement message is received, the call center may switch to a voice mode, as seen at block 450. The call may be switched and routed to a call center advisor.

When the acknowledgement is not received by the call center, the call center may resend a STV message and begin the acknowledgement process again, as seen back at blocks 435, 440, and 445. If the telematics unit does not receive an acknowledgement from the call center to the vehicle switch-to-voice acknowledgement before the delay period has ended, the telematics unit may wait until the end of the delay period, at which time the telematics unit may be switched to a voice-ready mode, as seen at block 455.

After the call center and the telematics unit have switched to a voice mode, they may begin a voice segment, as seen at block 460.

FIG. 5 shows a flow diagram of another embodiment of a method for transitioning from data to voice wireless communications during a communication session with a mobile vehicle, in accordance with the present invention at 500.

Data and voice communication transition method 500 may begin with voice communications already established, as seen at block 505.

The call center may send a prescribed modem signal, as seen at block 510. The telematics unit may receive the prescribed modem signal, and switch out of voice mode into a data-ready mode by muting the audio to the mobile vehicle. The telematics unit may reply by sending a prescribed modem signal and a connect message to the call center, as seen at block 515. The call center may continue to send the modem signal until a response from the vehicle is received successfully. The call then may be switched from a call center advisor and routed to the modem pool.

The call center may respond to the connect message and may send a system message, as seen at block 520. When a response to the connect message is not received back at the telematics unit after a predetermined time, such as after 300 milliseconds, the telematics unit may remain in voice mode and send another connect message. The telematics unit and the call center may monitor the call continually for incoming signals.

The telematics unit may respond to the system message, as seen at block 525. The telematics unit and the call center then may exchange data in a data segment, as seen at block 530.

When operations or a subscriber request requires use of a call center advisor, the calling center may send a switch-to-voice message (STV) comprising a message or a prescribed modem signal, as seen at block 535. The STV message and modem signal may indicate that the call center intends to move from the data segment to a voice segment with a human advisor in the call center. The telematics unit may send back a prescribed modem signal and begin a prescribed delay period, as seen at block 540.

The call center may or may not receive the modem signal from the telematics unit, as seen at block 545. When it does not receive the signal, the call center may send another STV message and prescribed modem signal, as seen back at block 535.

When the call center receives the prescribed modem switch-to-voice acknowledgement signal, it may switch to a voice mode and route the call from the modem pool back to a call center advisor, as seen at block 550. After a delay period has ended or an acknowledgement to the acknowledgement has been received, the telematics unit also may switch to a voice-ready mode and begin a voice segment with the call center.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of transitioning between voice and data communications with a mobile vehicle, comprising:
   sending a switch-to-voice command signal from a call center modem pool to the mobile vehicle;
   receiving a vehicle switch-to-voice acknowledgement signal at the call center;
   switching a call from the call center modem pool to a call center advisor in response to the vehicle switch-to-voice acknowledgement signal; and
   entering a voice-ready mode at the mobile vehicle when a predetermined delay period has elapsed after the vehicle switch-to-voice acknowledgement signal has been sent.

2. The method of claim 1 wherein the voice-ready mode comprises an un-muted audio signal.

3. A computer usable medium including a program for transitioning between voice and data communications with a mobile vehicle, comprising:
   computer program code to send a switch-to-voice command signal from a call center modem pool to the mobile vehicle;
   computer program code to receive a vehicle switch-to-voice acknowledgement signal at the call center;
   computer program code to switch a call from the call center modem pool to a call center advisor in response to the vehicle switch-to-voice acknowledgement signal; and
   computer program code to enter a voice-ready mode at the mobile vehicle when a predetermined delay period has elapsed after the vehicle switch-to-voice acknowledgement signal has been sent.

4. A system for transitioning between voice and data communications with a mobile vehicle, comprising:
   means for sending a switch-to-voice command signal from a call center modem pool to the mobile vehicle;
   means for receiving a vehicle switch-to-voice acknowledgement signal at the call center;
   means for switching a call from the call center modem pool to a call center advisor in response to the vehicle switch-to-voice acknowledgement signal; and
   means for entering a voice-ready mode at the mobile vehicle when a predetermined delay period has elapsed after the vehicle switch-to-voice acknowledgement signal has been sent.

* * * * *